US011121802B2

(12) United States Patent
Jiang et al.

(10) Patent No.: US 11,121,802 B2
(45) Date of Patent: Sep. 14, 2021

(54) CSI OBTAINING METHOD, SERVER, TERMINAL, AND AP

(71) Applicant: HUAWEI TECHNOLOGIES CO., LTD., Guangdong (CN)

(72) Inventors: Weipeng Jiang, Beijing (CN); Yongjun Liu, Beijing (CN); Yun Lei, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/258,303

(22) Filed: Jan. 25, 2019

(65) Prior Publication Data
US 2019/0158217 A1 May 23, 2019

Related U.S. Application Data

(63) Continuation of application No. PCT/CN2017/071710, filed on Jan. 19, 2017.

(30) Foreign Application Priority Data

Jul. 28, 2016 (CN) .......................... 201610605227.8

(51) Int. Cl.
*H04L 1/00* (2006.01)
*H04W 24/10* (2009.01)
(Continued)

(52) U.S. Cl.
CPC ......... *H04L 1/0026* (2013.01); *H04B 7/0626* (2013.01); *H04L 29/06* (2013.01);
(Continued)

(58) Field of Classification Search
CPC . H04L 1/0026; H04L 29/06; H04L 29/08648; H04L 29/0899; H04L 41/5058;
(Continued)

(56) References Cited

U.S. PATENT DOCUMENTS 9,179,249 B2 * 11/2015 Ding ..................... H04W 64/00
2005/0192029 A1 * 9/2005 Aigner .................. H04W 64/00
455/456.5
(Continued)

FOREIGN PATENT DOCUMENTS

CN 101877918 A 11/2010
CN 103108332 A 5/2013
(Continued)

*Primary Examiner* — Ian N Moore
*Assistant Examiner* — Latresa A McCallum
(74) *Attorney, Agent, or Firm* — Westerman, Hattori, Daniels & Adrian, LLP

(57) ABSTRACT

A method includes determining at least one first measurement AP in first storage APs according to the address of the first AP, sending a second CSI measurement request to the at least one first measurement AP, where the second CSI measurement request includes the address of the terminal, receiving first measurement data, where the first measurement data includes first CSI, the first CSI is obtained after a target measurement AP performs channel estimation on the first service data, and sending the first measurement data or a first processing result to the terminal, where the first processing result is obtained by using the first measurement data.

19 Claims, 6 Drawing Sheets

(51) Int. Cl.
*H04L 29/06* (2006.01)
*H04B 7/06* (2006.01)
*H04W 8/00* (2009.01)
*H04W 24/08* (2009.01)
*H04W 72/04* (2009.01)

(52) U.S. Cl.
CPC ........... *H04W 8/005* (2013.01); *H04W 24/08* (2013.01); *H04W 24/10* (2013.01); *H04W 72/0453* (2013.01)

(58) Field of Classification Search
CPC ..... H04L 41/145; H04L 43/00; H04B 7/0626; H04W 8/005; H04W 24/08; H04W 24/10; H04W 72/0453; H04W 40/24; H04W 48/16; H04W 16/18
See application file for complete search history.

(56) References Cited

U.S. PATENT DOCUMENTS

| | | | |
|---|---|---|---|
| 2012/0094710 A1 | 4/2012 | Jia et al. | |
| 2012/0190356 A1* | 7/2012 | Zhao | H04L 25/0204 455/422.1 |
| 2013/0316730 A1* | 11/2013 | Ding | G01S 5/0252 455/456.1 |
| 2014/0073336 A1 | 3/2014 | Kang | |
| 2014/0185605 A1 | 7/2014 | Oh et al. | |
| 2014/0293911 A1 | 10/2014 | Cheong et al. | |
| 2015/0219742 A1* | 8/2015 | Castagnoli | G01S 5/0081 370/336 |
| 2015/0311964 A1 | 10/2015 | Sohn et al. | |
| 2015/0312875 A1 | 10/2015 | Bhanage | |
| 2016/0066158 A1 | 3/2016 | Xiao et al. | |
| 2016/0135194 A1* | 5/2016 | Kim | H04L 5/0082 370/329 |

FOREIGN PATENT DOCUMENTS

| | | |
|---|---|---|
| CN | 103202085 A | 7/2013 |
| CN | 104168650 A | 11/2014 |
| CN | 104486729 A | 4/2015 |
| CN | 104618923 A | 5/2015 |
| CN | 105764031 A | 7/2016 |

\* cited by examiner

CSI OBTAINING METHOD, SERVER, TERMINAL, AND AP

CROSS-REFERENCE TO RELATED APPLICATIONS

This application is a continuation of International Application No. PCT/CN2017/071710, filed on Jan. 19, 2017, which claims priority to Chinese Patent Application No. 201610605227.8, filed on Jul. 28, 2016. The disclosures of the aforementioned applications are hereby incorporated by reference in their entireties.

TECHNICAL FIELD

The present disclosure relates to the communications field, and in particular, to a CSI obtaining method, a server, a terminal, and an AP.

BACKGROUND

Channel state information (CSI) is an amplitude change and a phase change encountered by a wireless signal from a transmit end to a receive end. The channel state information is unrelated to a transmit signal, and depends on a path, a reflector, an obstacle, and the like in an electromagnetic wave propagation process. Therefore, the channel state information depicts a physical environment from the transmit end to the receive end. Based on a CSI feature, the CSI has many potential applications, for example, CSI-based positioning, CSI-based posture recognition, or CSI-based human body sign detection. The potential applications of the CSI have a wide application range, and are expected to be a basic measurement feature in the future to be provided for application programs on multiple terminals. However, to implement these CSI-based potential applications by a terminal, a prerequisite is that an application layer of the terminal can conveniently and effectively obtain the CSI.

In the prior art, a terminal modifies a protocol layer, and provides source language for the outside, so that an application layer may obtain CSI. That is, after determining a measurement AP, the terminal obtains the CSI by collecting a beacon frame from the measurement AP, a Neighbor Discovery Protocol (NDP) frame, or a dedicated CSI measurement frame.

However, by using this method, the terminal scans only an AP that can provide a CSI measurement service, so as to determine a measurement AP in these APs that can provide a CSI measurement service, thereby obtaining the CSI. A quantity of measurement APs is limited because a scanning range of the terminal is limited. Consequently, an amount of obtained CSI is limited, and service precision is affected.

SUMMARY

Embodiments of this application provide a channel state information CSI obtaining method, a server, and a terminal, to effectively improve service precision.

According to a first aspect, an embodiment of this application provides a CSI obtaining method, including:

receiving a CSI obtaining request sent by a terminal, where the CSI obtaining request includes an address of a first access point (English full name: Access Point, AP for short) communicatively connected to the terminal and an address of the terminal; determining at least one first measurement AP in first storage APs according to the address of the first AP, where the first storage APs are APs that are stored by the server and that can perform channel estimation on service data to obtain CSI, and the at least one first measurement AP is an AP within coverage corresponding to the address of the first AP; sending a first CSI measurement request to the at least one first measurement AP, where the first CSI measurement request includes the address of the terminal, so that the at least one first measurement AP listens to, according to the address of the terminal, first service data sent by the terminal; receiving first measurement data, where the first measurement data includes first CSI, the first CSI is obtained after a target measurement AP performs channel estimation on the first service data obtained by means of listening, and the target measurement AP is an AP that obtains the first service data by means of listening in the at least one first measurement AP; and sending the first measurement data or a first processing result to the terminal, where the first processing result is obtained by using the first measurement data.

In this embodiment of this application, the first storage AP is an AP that is obtained by means of scanning by the server and that can perform channel estimation on service data to obtain CSI, and the first storage AP is a set of storage APs that can be communicatively connected to all terminals of the server.

In this embodiment of this application, the server determines the at least one first measurement AP located within the coverage corresponding to the address of the first AP. Because a quantity of APs obtained by the server is a sum of APs that can be scanned by multiple terminals, and is far greater than a quantity of APs scanned by a single terminal, a quantity of at least one first measurement APs determined by the server is far greater than a quantity of measurement APs determined by the terminal, and further, an amount of CSI obtained by the server is far greater than an amount of CSI obtained by the terminal. Therefore, service precision is effectively improved.

In one embodiment of this application, after obtaining the first measurement data, the server may obtain the first processing result according to the first measurement data, and determine precision of the first processing result. The precision is used to indicate a probability of the first processing result. When the precision of the first processing result is less than or equal to a preset threshold, the server sends a multicast request to the terminal, where the multicast request includes an address of the at least one first measurement AP, and the multicast request is used to instruct the terminal to send second service data to the at least one first measurement AP; receives second measurement data fed back by the at least one first measurement AP, where the second measurement data includes second CSI, and the second CSI is obtained after the at least one first measurement AP performs channel estimation on the second service data; and sends the second measurement data or a second processing result to the terminal, where the second processing result is obtained by using the second measurement data.

In this embodiment of this application, when determining that the precision of the first processing result is less than or equal to the preset threshold, the server sends the multicast request to the terminal, so that the terminal sends the second service data to the at least one first measurement AP, to obtain more CSI, and improve precision of a final processing result.

In one embodiment, in a CSI measurement process, the server may further send a second CSI measurement request to the terminal, where the second CSI measurement request includes an address of the at least one first measurement AP, so that the terminal determines a second measurement AP according to the address of the at least one first measurement AP.

In this embodiment of this application, the server sends the address of the at least one first measurement AP to the terminal, to increase a quantity of measurement APs of the terminal, thereby obtaining more CSI and improving precision of a final processing result.

In one embodiment, the first measurement data further includes identification information of the first CSI, and the identification information of the first CSI includes at least one of an antenna configuration of the at least one first measurement AP, a frequency band of the at least one first measurement AP, a channel of the at least one first measurement AP, a Media Access Control (English full name: Media Access Control, MAC for short) address of the terminal, or a MAC address of the at least one first measurement AP.

In this embodiment of this application, the first measurement data carries the identification information that identifies the first CSI, and this helps the server to identify a source of the first CSI, to effectively use the first CSI.

In one embodiment, of this application, a specific manner in which the server determines the at least one first measurement AP according to the address of the first AP is: determining, according to the address of the first AP, the coverage corresponding to the address of the first AP; and determining, according to the coverage and an address of the first storage AP, the at least one first measurement AP that is located within the coverage and that is in the first storage AP.

In practical application, the server may further determine the coverage of the first AP according to a physical transmission distance of the first AP and a MAC address of the first AP. Details are not limited herein.

In this embodiment of this application, the server selects the at least one first measurement AP from the first storage AP in the coverage corresponding to the address of the first AP. Therefore, a valid measurement AP may be determined, so as to avoid increased load on the server caused by sending information by the server to an AP that cannot provide valid CSI measurement.

In one embodiment, the server may further determine, according to the coverage and the address of the first storage AP, the at least one first to-be-determined AP located within the coverage; and determine the at least one first measurement AP in the at least one first to-be-determined AP according to at least one of a frequency band used by the at least one first to-be-determined AP, a channel of the at least one first to-be-determined AP, bandwidth of the at least one first to-be-determined AP, network transmission traffic, or network service performance.

In this embodiment of this application, the at least one first to-be-determined AP is an AP, within the coverage of the first AP, that is determined by the server and that can provide a CSI measurement service.

In this embodiment of this application, the server determines a most appropriate measurement AP according to multiple conditions, to ensure that most useful CSI information can be obtained, thereby ensuring that a service requirement is met.

In one embodiment, the address of the first AP is the MAC address of the first AP, the address of the terminal is a MAC address of the terminal, and the address of the first storage AP is a MAC address of the first storage AP.

In this embodiment of this application, a specific address type is not limited herein, provided that the address of the first AP can identify the first AP, the address of the terminal can identify the terminal, and the address of the first storage AP can identify the first storage AP.

In one embodiment, in practical application, the server may further record a first moment at which the CSI obtaining request is received, and start a first timer. After the first timer expires, if the server does not receive a CSI measurement request sent by the terminal again, the server stops a measurement service.

In practical application, the server may also receive a CSI obtaining request sent by another terminal. After the first timer expires, if the server neither receives the CSI obtaining request sent by the terminal, nor receives the CSI obtaining request sent by the another terminal, the server no longer determines a measurement AP and sends a CSI measurement request to the measurement AP; or if the server receives, in a timing period of the first timer, the CSI obtaining request sent by the terminal or the another terminal, the server continues to determine a measurement AP and sends a CSI measurement request to the measurement AP.

In this embodiment of this application, that the server receives the CSI obtaining request is used as a condition for providing a CSI measurement service, so as to avoid performing CSI measurement when there is no need to provide the CSI measurement service, thereby reducing network load.

According to a second aspect, an embodiment of this application provides a CSI obtaining method, and the method is applied to a terminal, and includes: sending a CSI obtaining request to a server, where the CSI obtaining request includes an address of a first AP communicatively connected to the terminal and an address of the terminal; and receiving first measurement data or a first processing result sent by the server, where the first processing result is obtained by using the first measurement data, and the first measurement data includes first CSI.

In this embodiment of this application, the terminal sends a CSI measurement request to the server, so that the at least one first measurement AP does not receive a control bit or an information bit after obtaining the first CSI, and instead, the at least one first measurement AP directly feeds back all the obtained first CSI to the server, so as to ensure leveraging of the first CSI.

In one embodiment, after the terminal receives the first measurement data or the first processing result, the terminal may further receive an address of at least one first measurement AP and precision of the first processing result that are sent by the server; if the precision is less than or equal to a preset threshold, send second service data to the at least one first measurement AP, so that the at least one first measurement AP performs channel estimation on the second service data to obtain second CSI; and receive second measurement data or a second processing result sent by the server, where the second measurement data includes the second CSI, and the second processing result is obtained by using the second measurement data.

In this embodiment of this application, when determining that the precision of the first processing result is less than or equal to the preset threshold, the terminal sends the second service data to the at least one first measurement AP, to obtain more CSI, and improve precision of a final processing result.

In one embodiment, the terminal may further receive an address of the at least one first measurement AP sent by the server; obtain a union set of an address of the second storage AP and the address of the at least one first measurement AP to obtain an address of a second measurement AP, where the second measurement AP is a union set of the second storage AP and the at least one first measurement AP, and the second storage AP is an AP that is stored by the terminal and the can be communicatively connected to the terminal; listen to, according to the address of the second measurement AP, third service data sent by an AP in the second measurement AP; and when the third service data is received, perform channel estimation on the third service data to obtain third CSI.

In this embodiment of this application, the second storage AP is an AP obtained by means of scanning by the terminal, and the second storage AP is an AP that can be communicatively connected to the terminal.

In this embodiment of this application, the terminal may obtain a union set of the received address of the at least one first measurement AP determined by the server and an AP that is provided by the terminal and that can provide a measurement service, so as to increase a quantity of measurement APs on a terminal side, thereby effectively improving service precision.

In one embodiment, the terminal obtains at least one of a service precision requirement or a service algorithm complexity requirement; and sends the CSI obtaining request to the server only when the service precision requirement is greater than a first preset value and/or when the service algorithm complexity requirement is greater than a second preset value.

In this embodiment of this application, in a case of a relatively high service precision requirement and relatively large service algorithm complexity, the terminal may perform CSI measurement with participation of the server, to obtain more CSI, thereby effectively improving service precision.

In one embodiment, the terminal may send the CSI obtaining request to the server in the following manner: sending the CSI obtaining request to the server in a form of a packet data unit. In this embodiment of this application, the terminal sends the CSI measurement request to the server in a form of a common data packet, so as to avoid establishing a dedicated measurement list, that is, the server may further continue to use original scheduling logic to reduce complexity.

In one embodiment, the address of the second storage AP is a MAC address, the address of the at least one first measurement AP is a MAC address, and the address of the terminal is a MAC address.

In this embodiment of this application, a specific address type is not limited herein, provided that the address of the at least one first measurement AP can identify the at least one first measurement AP, the address of the terminal can identify the terminal, and the address of the second storage AP can identify the second storage AP.

According to a third aspect, an embodiment of this application provides a CSI obtaining method, and the method is applied to an AP, and includes: receiving a first CSI measurement request sent by a server, where the first CSI measurement request includes an address of a terminal; listening to, according to the address of the terminal, first service data sent by the terminal; when the first service data is obtained by means of listening, performing channel estimation on the first service data sent by the terminal, to obtain first CSI; and sending the first measurement data to the server, where the first measurement data includes the first CSI.

In this embodiment of this application, after obtaining CSI information by means of channel estimation, the AP does not choose to discard the CSI information by receiving another control bit or information bit, and instead, the AP directly feeds back the CSI information to the server, so as to ensure leveraging of the CSI information.

In one embodiment, the AP may send the first measurement data to the server in the following manner: sending the first measurement data to the server in a form of a packet data unit.

In one embodiment, after the AP receives the first CSI measurement request sent by the server, the AP records a second moment at which the first CSI measurement request is received, and starts a second timer. After the second timer expires, if the AP does not receive a measurement request sent by the server, the AP stops a measurement service, that is, the AP no longer listens to data, and no longer feeds back measurement data.

In this embodiment of this application, that the AP receives the CSI measurement request is used as a condition for feeding back a CSI measurement result, so as to avoid feeding back the CSI measurement result when there is no need to perform CSI measurement, thereby reducing network load.

According to a fourth aspect, an embodiment of this application provides a CSI obtaining method, and the method is applied to a terminal, and includes: listening to, according to an address of a second storage AP, fourth service data sent by the second storage AP, where the second storage AP is an AP that is stored by the terminal and that can be communicatively connected to the terminal; performing channel estimation on the fourth service data obtained by means of listening, to obtain fourth CSI; and obtaining a fourth processing result according to all the fourth CSI.

In this embodiment of this application, the terminal performs, according to a measurement AP provided by the terminal, CSI measurement without participation of a server, thereby reducing network load.

In one embodiment, when a first AP is an AP that obtains CSI by performing channel estimation on service data, the terminal may further receive third measurement data sent by the first AP. The third measurement data includes fifth CSI, the fifth CSI is obtained after the first AP performs channel estimation on fifth service data sent by the terminal, and the first AP is an AP communicatively connected to the terminal.

Correspondingly, the obtaining, according to all the fourth CSI, a processing result corresponding to all the fourth CSI includes: obtaining the fourth processing result according to a union set of all the fourth CSI and the fifth CSI.

In this embodiment of this application, the terminal receives CSI of uplink data fed back by the first AP, so as to increase an amount of CSI, thereby improving service precision.

In one embodiment, when a service precision requirement is greater than a first preset value or when a service algorithm complexity requirement is less than a second preset value, the terminal may further listen to, according to the address of the second storage AP, the fourth service data sent by the second storage AP.

In this embodiment of this application, the terminal selects a proper CSI measurement manner according to a practical application case, and this facilitates reducing of load in a CSI measurement process.

According to a fifth aspect, an embodiment of this application provides a server, and the server has a function for implementing the server in the foregoing method. The function may be implemented by using hardware, or may be implemented by hardware by executing corresponding software. The hardware or software includes one or more modules corresponding to the foregoing function.

In one embodiment, the server includes:

a receiving module, configured to receive a CSI obtaining request sent by a terminal, where the CSI obtaining request includes an address of a first access point AP communicatively connected to the terminal and an address of the terminal;

a processing module, configured to determine at least one first measurement AP in first storage APs according to the address of the first AP received by the receiving module, where the first storage APs are APs that are stored by the server and that can perform channel estimation on service data to obtain CSI, and the at least one first measurement AP is an AP within coverage corresponding to the address of the first AP; and the sending module, configured to send a first CSI measurement request to the at least one first measurement AP determined by the processing module, where the first CSI measurement request includes the address of the terminal, so that the at least one first measurement AP listens to, according to the address of the terminal, first service data sent by the terminal.

The receiving module is further configured to receive first measurement data. The first measurement data includes first CSI, the first CSI is obtained after a target measurement AP performs channel estimation on the first service data obtained by means of listening, and the target measurement AP is an AP that obtains the first service data by means of listening in the at least one first measurement AP.

The sending module is further configured to send the first measurement data or a first processing result to the terminal. The first processing result is obtained by using the first measurement data.

In another embodiment, the server includes:

a transceiver, a processor, and a bus.

The transceiver is connected to the processor by using the bus.

The transceiver performs the following operation:

receiving a CSI obtaining request sent by a terminal, where the CSI obtaining request includes an address of a first access point AP communicatively connected to the terminal and an address of the terminal.

The processor performs the following operation:

determining at least one first measurement AP in first storage APs according to the address of the first AP, where the first storage APs are APs that are stored by the server and that can perform channel estimation on service data to obtain CSI, and the at least one first measurement AP is an AP within coverage corresponding to the address of the first AP.

The transceiver further performs the following operations:

sending a first CSI measurement request to the at least one first measurement AP, where the first CSI measurement request includes the address of the terminal, so that the at least one first measurement AP listens to, according to the address of the terminal, first service data sent by the terminal; receiving first measurement data, where the first measurement data includes first CSI, the first CSI is obtained after a target measurement AP performs channel estimation on the first service data obtained by means of listening, and the target measurement AP is an AP that obtains the first service data by means of listening in the at least one first measurement AP; and sending the first measurement data or a first processing result to the terminal, where the first processing result is obtained by using the first measurement data.

According to a sixth aspect, an embodiment of this application provides a terminal, and the terminal has a function for implementing the terminal in the foregoing method. The function may be implemented by using hardware, or may be implemented by hardware by executing corresponding software. The hardware or software includes one or more modules corresponding to the foregoing function.

In one embodiment, the terminal includes:

a sending module, configured to send a CSI obtaining request to a server, where the CSI obtaining request includes an address of a first AP communicatively connected to the terminal and an address of the terminal; and a receiving module, configured to receive first measurement data or a first processing result sent by the server, where the first processing result is obtained by using the first measurement data, and the first measurement data includes first CSI.

In another embodiment, the terminal includes:

a transceiver.

The transceiver performs the following operations:

sending a CSI obtaining request to a server, where the CSI obtaining request includes an address of a first AP communicatively connected to the terminal and an address of the terminal; and receiving first measurement data or a first processing result sent by the server, where the first processing result is obtained by using the first measurement data, and the first measurement data includes first CSI.

According to a seventh aspect, an embodiment of this application provides an AP, and the AP has a function for implementing the AP in the foregoing method. The function may be implemented by using hardware, or may be implemented by hardware by executing corresponding software. The hardware or software includes one or more modules corresponding to the foregoing function.

In one embodiment, the AP includes:

a receiving module, configured to receive a first CSI measurement request sent by a server, where the first CSI measurement request includes an address of a terminal;

a processing module, configured to: listen to, according to the address of the terminal received by the receiving module, first service data sent by the terminal; and when the third service data is obtained by means of listening, perform channel estimation on the first service data sent by the terminal, to obtain first CSI; and a sending module, configured to send the first measurement data to the server, where the first measurement data includes the first CSI.

In another embodiment, the AP includes:

a transceiver, a processor, and a bus.

The transceiver is connected to the processor by using the bus.

The transceiver performs the following operation:

receiving a first CSI measurement request sent by a server, where the first CSI measurement request includes a MAC address of a terminal.

The processor performs the following operations:

listening to, according to the address of the terminal, first service data sent by the terminal; and when the third service data is obtained by means of listening, performing channel estimation on the first service data sent by the terminal, to obtain first CSI.

The transceiver further performs the following operation:

sending the first measurement data to the server, where the first measurement data includes the first CSI.

According to an eighth aspect, an embodiment of this application provides a terminal, and the terminal has a function for implementing the terminal in the foregoing method. The function may be implemented by using hardware, or may be implemented by hardware by executing corresponding software. The hardware or software includes one or more modules corresponding to the foregoing function.

In one embodiment, the terminal includes:

a processing module, configured to: listen to, according to an address of a second storage AP, fourth service data sent by the second storage AP, where the second storage AP is an AP that is stored by the terminal and that can be communicatively connected to the terminal; and perform channel estimation on the fourth service data obtained by means of listening, to obtain fourth CSI; and obtain a fourth processing result according to all the fourth CSI.

In another embodiment, the terminal includes:

a processor.

The processor performs the following operations:

listening to, according to an address of a second storage AP, fourth service data sent by the second storage AP, where the second storage AP is an AP that is stored by the terminal and that can be communicatively connected to the terminal; and performing channel estimation on the fourth service data obtained by means of listening, to obtain fourth CSI; and obtaining a fourth processing result according to all the fourth CSI.

According to a ninth aspect, an embodiment of this application provides a CSI obtaining system, including a server, a terminal, and an AP. The terminal is configured to send a CSI obtaining request to the server, where the CSI obtaining request includes an address of a first AP that is accessed by the terminal and an address of the terminal. The server is configured to: determine at least one first measurement AP according to the address of the first AP; and send the first CSI measurement request to the at least one first measurement AP, where the first CSI measurement request includes the address of the terminal. The AP is configured to: listen to first service data sent by the terminal; perform channel estimation on the first service data to obtain first CSI, so as to generate first measurement data; and send the first measurement data to the server.

A tenth aspect provides a computer storage medium, the computer storage medium stores program code, and the program code is used to execute the method in the foregoing first aspect.

It can be learned from the foregoing technical solutions that the embodiments of this application have the following advantages: The server determines the at least one first measurement AP according to the address of the first AP, where the at least one first measurement AP is the AP located within the coverage corresponding to the address of the first AP. Because a quantity of APs obtained by the server is a sum of APs that can be scanned by multiple terminals, and is greater than a quantity of APs scanned by a single terminal, a quantity of at least one first measurement APs determined by the server is greater than a quantity of measurement APs determined by the terminal, and further, an amount of CSI obtained by the server is greater than an amount of CSI obtained by the terminal. Therefore, service precision is effectively improved.

DESCRIPTION OF EMBODIMENTS

Embodiments of this application provide a channel state information CSI obtaining method, a server, and a terminal, so as to leverage CSI.

In the specification, claims, and accompanying drawings of this application, the terms "first", "second", "third", "fourth", and so on (if exists) are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. Moreover, the terms "include", "have", and any other variants thereof are intended to cover non-exclusive inclusion, for example, a process, a method, a system, a product, or a device that includes a series of operations or units is not necessarily limited to those operations or units that are clearly listed, but may include other operations or units that are not clearly listed or are inherent to the process, the method, the system, the product, or the device.

Figure 1:
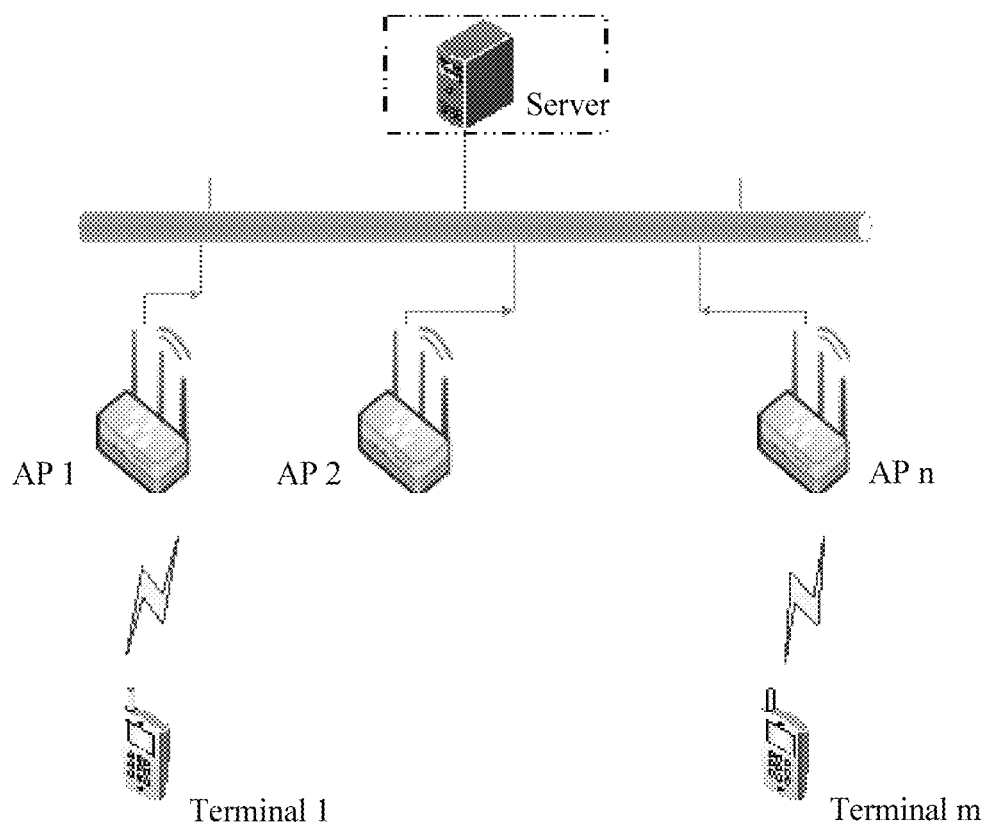
FIG. 1 is a schematic diagram of a CSI obtaining system according to an embodiment of this application.

Referring to a CSI obtaining system shown in FIG. 1, the CSI obtaining system includes a server, a terminal, and an AP. The server is a node that manages and controls data receiving and sending of the terminal in a network. The terminal is user equipment that communicates with the server in the network. The AP is a wireless access point at which the terminal communicates with the server.

Based on a CSI feature, CSI has many potential applications. In addition, the potential applications of the CSI have a wide application range, and are expected to be a basic measurement feature in the future to be provided to application programs on multiple intelligent systems. However, to implement these CSI-based potential applications by an intelligent system, a prerequisite is that an application layer of the intelligent system can conveniently and effectively obtain the CSI.

In the prior art, a terminal modifies a protocol layer, and provides source language for the outside, so that an application layer may obtain CSI. That is, after determining a measurement AP, the terminal obtains the CSI by collecting a beacon (English full name: beacon) frame from the measurement AP, a Neighbor Discovery Protocol (English full name: neighbor discovery protocol, NDP for short) frame, or a dedicated CSI measurement frame. However, by using this method, the terminal scans only an AP that can provide a CSI measurement service, so as to determine a measurement AP in these APs that can provide a CSI measurement service, thereby obtaining the CSI. A quantity of measurement APs is limited because a scanning range of the terminal is limited. Consequently, an amount of obtained CSI is limited, and service precision is affected.

To resolve this problem, the embodiments of this application provide the following solutions: receiving a CSI obtaining request sent by a terminal, where the CSI obtaining request includes an address of a first AP communicatively connected to the terminal and an address of the terminal; determining at least one first measurement AP according to the address of the first AP; sending a first CSI measurement request to the at least one first measurement AP, where the first CSI measurement request includes the address of the terminal, so that the at least one first measurement AP listens to, according to the address of the terminal, first service data sent by the terminal; receiving first measurement data, where the first measurement data includes first CSI, the first CSI is obtained after a target measurement AP performs channel estimation on the first service data, and the target measurement AP is an AP that receives the first service data in the at least one first measurement AP; and sending the first measurement data or a first processing result to the terminal, where the first processing result is obtained by using the first measurement data.

The terminal in the embodiments of this application may be a device that provides a user with voice and/or data connectivity, a handheld device with a radio connection function, or another processing device connected to a wireless modem. A wireless terminal may communicate with one or more core networks through a radio access network (Radio Access Network, RAN for short). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communications service (English full name: Personal Communications Service, PCS for short) phone, a cordless phone, a Session Initiation Protocol (SIP) phone, a wireless local loop (English full name: Wireless Local Loop, WLL for short) station, or a personal digital assistant (English full name: Personal Digital Assistant, PDA for short). The wireless terminal may also be referred to as a system, a subscriber unit (Subscriber Unit), a subscriber station (Subscriber Station), a mobile station (Mobile Station), a mobile station (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

Figure 2:
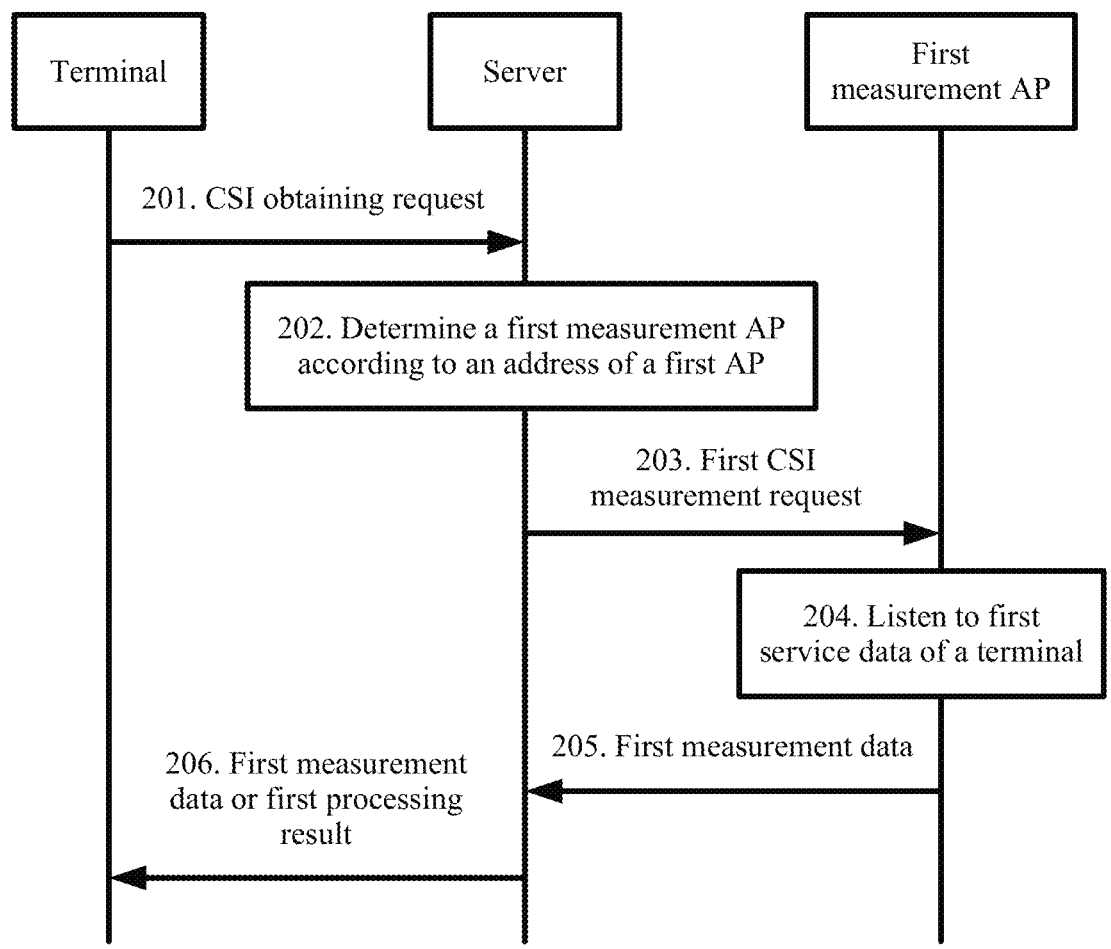
FIG. 2 is a schematic diagram of an embodiment of a CSI obtaining method according to an embodiment of this application.
Figure 3:
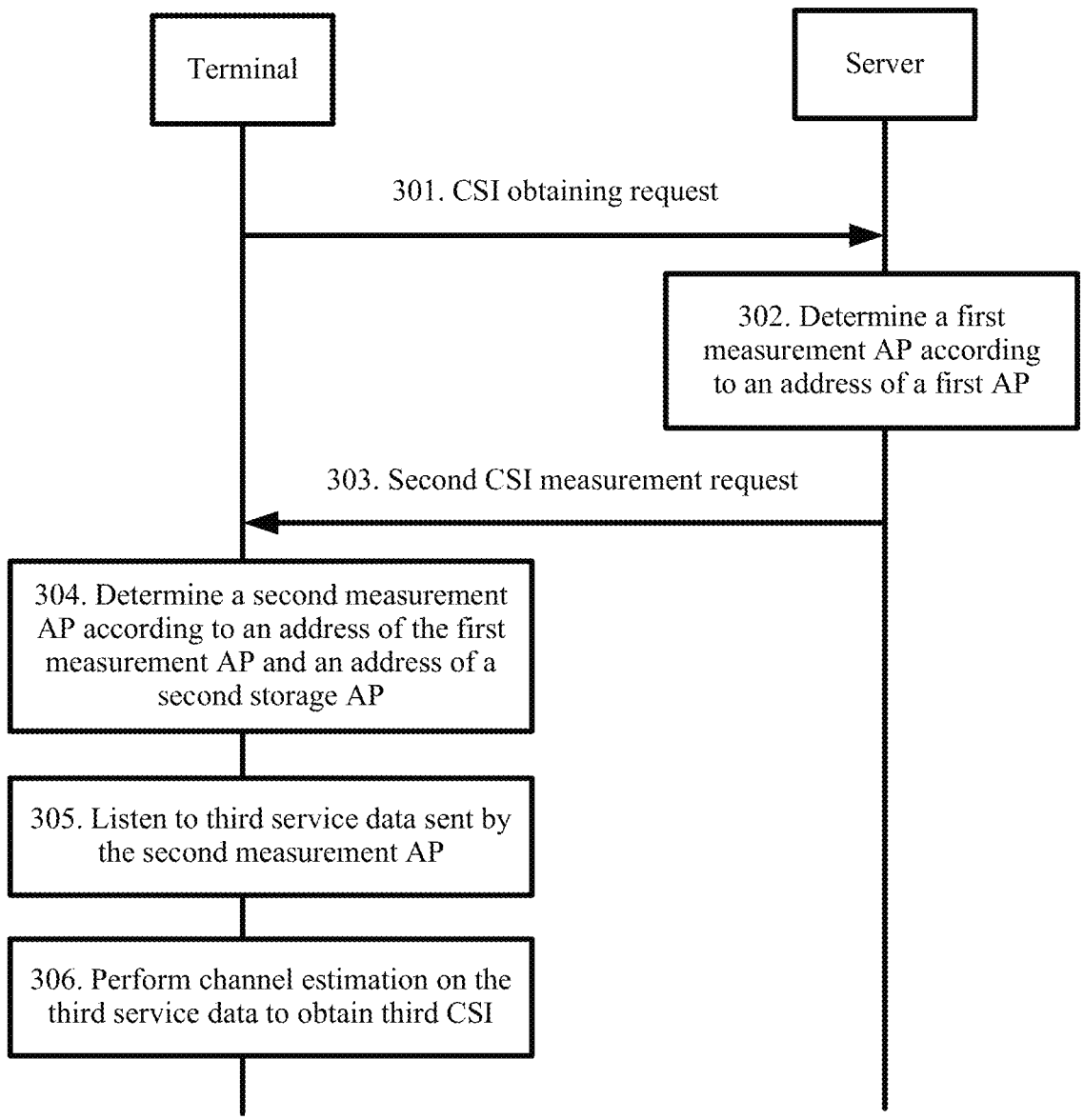
FIG. 3 is a schematic diagram of another embodiment of a CSI obtaining method according to an embodiment of this application.

In this application, there are the following several possible implementations in which an AP provides a CSI measurement service, and the possible implementations are separately shown in FIG. 2 and FIG. 3.

For a specific case, refer to FIG. 2. In an embodiment of this application, a manner in which an AP provides a CSI measurement service is: the AP sends measured CSI of an uplink channel to a server, and includes the following operations.

201. A terminal sends a CSI obtaining request to a server.

The terminal accesses a first AP in a service area, and starts to perform a service operation. A CSI measurement requirement may be generated in a process of executing the service. The terminal sends the CSI obtaining request to the server in a form of a packet data unit (similar to a form of sending a common data packet such as a video image). The CSI obtaining request includes but is not limited to an address of the terminal and an address of the first AP. For example, the terminal is communicatively connected to an AP inside a shopping mall, is performing navigation in the shopping mall, and needs to perform positioning by using CSI information or needs to measure a pulse of a user. In this case, the terminal may send a measurement request to the server.

In practical application, the address of the terminal may be a MAC address, or may be another address that can identify the terminal. Similarly, the address of the first AP may be a MAC address, or may be another address that can identify the first AP. A specific form is not limited herein.

The terminal may send the CSI obtaining request to the server according to a preset period. Herein, period duration is set by the user, for example, is set to 10 seconds, provided that the terminal can normally use CSI during service execution. Details are not limited herein.

202. The server determines at least one first measurement AP according to an address of a first AP.

The server receives the CSI obtaining request sent by the terminal, and parses the CSI obtaining request to obtain the address of the first AP. The server determines the at least one first measurement AP according to the address of the first AP.

In practical application, the server may determine the at least one first measurement AP in the following manners:

The server may determine coverage of the first AP according to a MAC address of the first AP, and determine, according to the MAC address of the first AP and an address of a first storage AP, at least one first to-be-determined AP located within the coverage corresponding to the MAC address of the first AP. The first storage AP is an AP that obtains CSI by performing channel estimation on service data. Then, the server determines the at least one first measurement AP in the at least one first to-be-determined AP according to at least one of a frequency band of the at least one first to-be-determined AP, a channel of the to-be-determined AP, bandwidth of the at least one first to-be-determined AP, network transmission traffic, or network service performance.

In this embodiment, the first storage AP is an AP that is obtained by means of real-time scanning by the server and that can perform channel estimation on service data to obtain CSI, and a quantity of first storage APs is a quantity of APs that are scanned by terminals communicatively connected to the server and that can perform channel estimation on service data to obtain CSI.

In practical application, for example, first storage APs that may be scanned by the server include 26 APs from A to Z, and all the 26 APs can provide CSI measurement, that is, can obtain CSI by performing channel estimation on service data. It is determined, according to a MAC address of A (an AP of the terminal is A), that A is located in a shopping mall, and six APs A, B, C, D, E, and F exist in the shopping mall, and are used as at least one first to-be-determined APs. In addition, the server performs comprehensive consideration or separate consideration separately according to frequency bands, channels, or bandwidth that are of the six APs A, B, C, D, E, and F. A frequency band is used as an example. In the current six APs A, B, C, D, E, and F obtained by the server, B, E, and F currently use a frequency band 1, A and C use a frequency band 2, and D uses a frequency band 3. Because only a same frequency band can be monitored at a same moment, to obtain CSI information as much as possible, the server determines that three APs B, E, and F are at least one first measurement APs. Likewise, a channel is used as an example. In the current six APs A, B, C, D, E, and F obtained by the server, B, E, and F currently all belong to a channel 1, A and C currently all belong to a channel 2, and D currently belongs to a channel 3. Because only a same channel can be monitored at a same moment, to obtain CSI information as much as possible, the server determines that three APs B, E, and F are at least one first measurement APs. Similarly, the server should consider, as at least one first measurement AP, an AP that can obtain CSI as much as possible. Alternatively, the server may select the at least one first measurement AP according to another condition, or may perform comprehensive consideration according to all conditions. Details are not limited herein.

In practical application, after determining the MAC address of the first AP, the server may determine the coverage of the first AP according to a physical transmission distance of the first AP, or may determine the coverage of the first AP according to another condition, provided that the server can determine the coverage of the first AP herein. A specific manner is not limited herein.

However, in practical application, the server may further record a current moment after receiving the CSI obtaining request, and start a timer to start timing. After a sending period of the terminal, if the server does not receive the CSI obtaining request again sent by the terminal or does not receive a CSI obtaining request sent by another terminal, the server determines that there is no CSI measurement requirement currently, so as to stop providing a CSI measurement service. For example, a moment at which the server receives the CSI obtaining request is 8:20:15 am, and duration of the timer is 10 seconds. When the timer expires, that is, the moment becomes 8:20:25 am, and the server does not receive another CSI obtaining request, the server determines that CSI measurement does not need to be performed currently, and stops providing the CSI measurement service.

203. The server sends a first CSI measurement request to the at least one first measurement AP.

After determining the at least one first measurement AP, the server sends the first CSI measurement request to the at least one first measurement AP. The first CSI measurement request includes but is not limited to the address of the terminal. For example, in the foregoing application, the server sends the first CSI measurement request to three APs B, E, and F.

In practical application, the server may also adjust a quantity of measurement APs by receiving a measurement result fed back by a measurement AP. For example, if the server receives only a CSI measurement result fed back by E, when sending a CSI measurement request next time, the server merely uses E as a measurement AP and sends the CSI measurement request.

204. The at least one first measurement AP listens to first service data of the terminal.

After receiving the first CSI measurement request, the at least one first measurement AP parses the first CSI measurement request to obtain the address of the terminal. The at least one first measurement AP starts to listen to service data of the terminal according to the address of the terminal, and uses, as a target measurement AP, the AP that obtains the first service data of the terminal by means of listening in the at least one first measurement AP. The target measurement AP performs channel estimation on the first service data of the terminal obtained by means of listening, to obtain first CSI, and uses at least one of an antenna configuration of the target measurement AP, a frequency band of the target measurement AP, a channel of the target measurement AP, CSI of the target measurement AP, a MAC address of the terminal, or a MAC address of the target measurement AP as an identifier of the first CSI, and generates first measurement data with the first CSI.

In this embodiment, the first CSI obtained by means of channel estimation by the target measurement AP is complete CSI, and a process of receiving a control bit or an information bit or the like is no longer performed to avoid discarding of the complete CSI.

In practical application, not all the at least one first measurement APs may receive the first service data sent by the terminal. For example, in the foregoing application, the three APs B, E, and F are used as at least one first measurement APs. However, only E actually receives the first service data of the terminal. In this case, E obtains the first CSI by means of channel estimation. The identifier of the first CSI may include at least one of an antenna configuration of E, a frequency band of E, a channel of E, CSI of E, the MAC address of the terminal, or a MAC address of E.

205. The at least one first measurement AP sends first measurement data to the server.

After obtaining the first CSI, the at least one first measurement AP packs the first CSI into a data packet, and sends the data packet to the server according to a preset period. For example, the target measurement AP may feed back CSI to the server every two seconds.

In an actual use process, when the at least one first measurement AP receives the CSI obtaining request sent by the server, the at least one first measurement AP may further record a current moment and start a timer. After the timer expires, if the at least one first measurement AP does not receive the CSI measurement request sent by the server, the first AP stops feeding back a CSI measurement result. For example, a moment at which the at least one first measurement AP receives the CSI obtaining request sent by the server is 8:20:17 am, and duration of the second timer is 10 seconds. In this case, if the at least one first measurement AP does not receive the CSI measurement request sent by the server at 8:20:27 am, the at least one first measurement AP considers that CSI measurement no longer needs to be performed currently, and the at least one first measurement AP stops feeding back a CSI measurement result to the server.

In addition, after receiving the CSI obtaining request in a use process, the at least one first measurement AP does not need to specially send, to the server, a message for approving of providing CSI measurement. If the at least one first measurement AP feeds back a CSI measurement result to the server, it indicates that the at least one first measurement AP approves of providing a CSI measurement service; or if the at least one first measurement AP does not feed back a CSI measurement result to the server, it indicates that the at least one first measurement AP disapproves of providing a CSI measurement service.

206. The server sends the first measurement data or a first processing result to the terminal.

After receiving the first measurement data, the server performs, according to a practical service requirement, corresponding processing on the first measurement data to obtain the first processing result, and sends the first processing result to the terminal in a form of service data. Alternatively, the server directly sends the first measurement data to the terminal, and the terminal performs corresponding processing on the first measurement data to obtain the first processing result. For example, if the terminal currently executes a positioning service in a shopping mall, the server positions, according to the first CSI, an information desk at which the terminal is currently located in the shopping mall, and sends an obtained result to the terminal, so as to complete a service requirement; or if the terminal currently executes a positioning service in a shopping mall, and receives the first measurement data sent by the server, the terminal may perform corresponding processing according to the first measurement data to obtain an information desk at which the terminal is currently located in the shopping mall. Likewise, when the terminal measures a pulse of a user, it may be obtained similarly according to the first measurement data that a current pulse rate of the user is 79 times per minute.

In practical application, all of the first measurement data received by the server and the first processing result obtained by the server may not meet the current service precision requirement, and service precision herein is a probability value of each processing result obtained according to measurement data. For example, current service precision is 70%, but a highest probability in the first processing result is merely 60%. It indicates that the first CSI is not enough, and the server needs to obtain more CSI. In this case, the server may initiate a multicast request to the terminal. The multicast request includes an address of the at least one first measurement AP, and the multicast request has a specific field to instruct the terminal to send service data to the at least one first measurement AP. Therefore, the at least one first measurement AP may perform channel estimation on the service data sent by the terminal, to obtain CSI, so as to feed back the CSI to the server. For example, the terminal sends the service data to three APs B, E, and F. In this way, all the three APs B, E, and F feed back CSI to the server, and an amount of CSI is increased compared with a case in which only E feeds back the CSI to the server. In this embodiment, only a positioning service is used as an example. However, the CSI may be also used for another item. For example, posture recognition may be also performed based on the CSI. Wireless signal propagation is affected by body movement. Therefore, action and posture recognition may be performed by collecting CSI in an area. For example, in a somatosensory game, different postures represent different operations. The game terminal collects CSI in a game area, to determine whether a degree of similarity between a current body posture and a preset posture meets a preset threshold, and if yes, determines that the posture is valid, so as to perform a corresponding operation.

In addition, in practical application, when performing a service operation, the terminal may further determine the service precision requirement and the service computation complexity requirement, and select a proper measurement mode according to the service precision requirement and the service computation complexity requirement. Herein, service precision is a probability value of each processing result that is obtained according to measurement data. Different services have different service precision requirements and service algorithm complexity requirements. The terminal may obtain a service precision requirement and a service algorithm complexity requirement of each service by querying a mapping table. For example, there are two services of positioning Shenzhen in Guangdong province and positioning Shenzhen International Trade Center in Guangdong province. It is assumed that service precision of positioning Shenzhen in Guangdong province is 60%, and a service algorithm complexity requirement is level 5; service precision of positioning Shenzhen International Trade Center in Guangdong province is 70%, and a service algorithm complexity requirement is level 8. In addition, if the terminal determines that a service whose service precision requirement is greater than 65% or service computation complexity requirement is greater than level 6, measurement is performed for the service with participation of the server, and for a service whose service precision requirement is less than or equal to 65% or service computation complexity requirement is less than or equal to level 6, measurement is performed with participation of only the terminal. In this case, when executing the service of positioning Shenzhen in Guangdong province, only the terminal may be used for measurement. However, when executing the service of positioning Shenzhen International Trade Center in Guangdong province, the terminal needs to send a measurement request to the server. Certainly, how to determine the service precision requirement and the service algorithm complexity requirement herein may be set by a user, and the mapping table may also be set by the user. Details are not limited herein.

In this embodiment, the server determines the at least one first measurement AP located within the coverage corresponding to the MAC address of the first AP. Because a quantity of APs obtained by the server is a sum of APs that can be scanned by multiple terminals, and is far greater than a quantity of APs scanned by a single terminal, a quantity of at least one first measurement APs determined by the server is far greater than a quantity of measurement APs determined by the terminal, and further, an amount of CSI obtained by the server is far greater than an amount of CSI obtained by the terminal. Therefore, service precision is effectively improved. In addition, CSI processing may be further performed on a server side to reduce massive CSI information transmission and reduce network load, and the terminal sends the CSI measurement request to the server in the form of a packet data unit, to reduce logic complexity.

For a specific case, refer to FIG. 3. In this embodiment of this application, a manner in which an AP provides a CSI measurement service is: a terminal measures downlink service data of the AP to obtain CSI, and includes the following operations.

Operation 301 is the same as operation 201, and operation 302 is the same as operation 202. Details are not described herein again.

303. The server sends a second CSI measurement request to the terminal.

The server sends the second CSI measurement request to the terminal in a form of service data. The second CSI measurement request includes an address of the at least one first measurement AP. In addition, the second CSI measurement request has a specific field to instruct the terminal to determine a second measurement AP. As mentioned above, for example, the server sends addresses of B, E, and F to the terminal.

304. The terminal determines a second measurement AP according to an address of the at least one first measurement AP and an address of a second storage AP.

After receiving the address of the at least one first measurement AP, the terminal obtains a union set of the address of the at least one first measurement AP and an address of a second storage AP that is provided by a local application layer of the terminal, to obtain an address of the second measurement AP. The second storage AP herein is an AP that is obtained by means of scanning by the terminal and that is stored in the terminal. For example, second storage APs provided by the local application layer of the terminal are four APs B, C, D, and F, and second measurement APs determined by the terminal are five APs B, C, D, E, and F.

305. The terminal listens to third service data sent by the second measurement AP.

The terminal listens to the third service data sent by the second measurement AP. In practical application, not each second measurement AP may send service data to the terminal. For example, only D, E, and F in the five APs B, C, D, E, and F may send service data to the terminal.

306. The terminal performs channel estimation on the third service data to obtain third CSI.

After receiving the third service data sent by the second measurement AP, the terminal may obtain the third CSI by performing channel estimation on the service data. For example, in the foregoing application, the terminal may receive service data sent by the three APs D, E, and F. In this case, the terminal may perform channel estimation on the service data of the three APs D, E, and F to obtain CSI.

In practical application, after obtaining the third CSI, the terminal may further obtain a processing result according to the third CSI. For example, if the terminal currently executes a positioning service in a shopping mall, the terminal positions, according to the third CSI, an information desk at which the terminal is currently located in the shopping mall; or if the terminal needs to measure a pulse of a user, the terminal determines, according to the third CSI, that a pulse rate of the user is 79 times per minute.

In practical application, when performing a service operation, the terminal may further determine the service precision requirement and the service computation complexity requirement, and select a proper measurement mode according to the service precision requirement and the service computation complexity requirement. Herein, service precision is a probability value of each processing result that is obtained according to measurement data. Different services have different service precision requirements and service algorithm complexity requirements. The terminal may obtain a service precision requirement and a service algorithm complexity requirement of each service by querying a mapping table. For example, there are two services of positioning Shenzhen in Guangdong province and positioning Shenzhen International Trade Center in Guangdong province. It is assumed that service precision of positioning Shenzhen in Guangdong province is 60%, and a service algorithm complexity requirement is level 5; service precision of positioning Shenzhen International Trade Center in Guangdong province is 70%, and a service algorithm complexity requirement is level 8. In addition, if the terminal determines that a service whose service precision requirement is greater than 65% or service computation complexity requirement is greater than level 6, measurement is performed for the service with participation of the server, and for a service whose service precision requirement is less than or equal to 65% or service computation complexity requirement is less than or equal to level 6, measurement is performed with participation of only the terminal. In this case, when executing the service of positioning Shenzhen in Guangdong province, only the terminal may be used for measurement. However, when executing the service of positioning Shenzhen International Trade Center in Guangdong province, the terminal needs to send a measurement request to the server. Certainly, how to determine the service precision requirement and the service algorithm complexity requirement herein may be set by a user, and the mapping table may also be set by the user. Details are not limited herein. In this embodiment, only a positioning service is used as an example. However, the CSI may be also used for another item. For example, posture recognition may be also performed based on the CSI. Wireless signal propagation is affected by body movement. Therefore, action and posture recognition may be performed by collecting CSI in an area. For example, in a somatosensory game, different postures represent different operations. The game terminal collects CSI in a game area, to determine whether a degree of similarity between a current body posture and a preset posture meets a preset threshold, and if yes, determines that the posture is valid, so as to perform a corresponding operation. In practical application, the terminal may perform CSI measurement without the server, that is, the terminal does not consider the service precision requirement and the service algorithm complexity requirement, and only the terminal is used to perform CSI measurement. A specific measurement manner is not limited herein.

In practical application, when only the terminal is used to perform CSI measurement, if the first AP communicatively connected to the terminal can provide a CSI measurement service, the terminal may further receive measurement data fed back by the first AP.

In this embodiment, the server sends information about the at least one first measurement AP to the terminal. After determining the second measurement AP according to the address of the at least one first measurement AP and the address of the second storage AP provided by the terminal, the terminal performs channel estimation on service data sent by the second measurement AP to obtain CSI. Therefore, CSI information on a downlink is provided, thereby leveraging the CSI and improving service precision.

The CSI obtaining method in the embodiments of this application is described above, and the following describes a server, a terminal, and an AP in the embodiments of this application.

Figure 4:
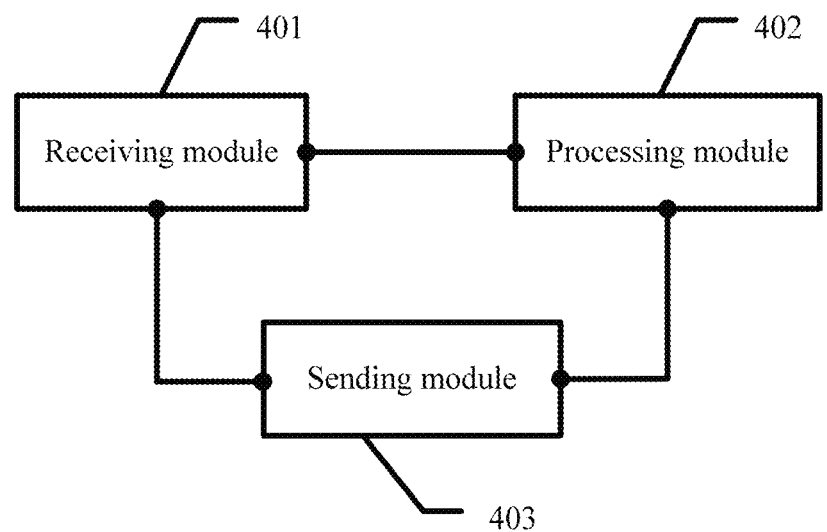
FIG. 4 is a schematic diagram of an embodiment of a server according to an embodiment of this application.

Referring to FIG. 4, an embodiment of a server according to an embodiment of this application includes:

a receiving module 401, a processing module 402, and a sending module 403.

The receiving module 401 is configured to receive a CSI obtaining request sent by a terminal. The CSI obtaining request includes an address of a first access point AP communicatively connected to the terminal and an address of the terminal.

The processing module 402 is configured to determine at least one first measurement AP in first storage APs according to the address of the first AP that is received by the receiving module 401. The first storage APs are APs that are stored by the server and that can perform channel estimation on service data to obtain CSI, and the at least one first measurement AP is an AP within coverage corresponding to the address of the first AP.

The sending module 403 is configured to send a first CSI measurement request to the at least one first measurement AP determined by the processing module 402, where the first CSI measurement request includes the address of the terminal, so that the at least one first measurement AP listens to, according to the address of the terminal, first service data sent by the terminal.

The receiving module 401 is configured to receive first measurement data. The first measurement data includes first CSI, the first CSI is obtained after a target measurement AP performs channel estimation on the first service data, and the target measurement AP is an AP that receives the first service data in the at least one first measurement AP.

The sending module 403 is further configured to send the first measurement data or a first processing result to the terminal. The first processing result is obtained by using the first measurement data.

With reference to the foregoing embodiment, the processing module 402 is further configured to obtain precision of the first processing result according to the first measurement data. The sending module 403 is further configured to: if the precision is less than or equal to a preset threshold, send a multicast request to the terminal. The multicast request includes an address of the at least one first measurement AP, and the multicast request is used to instruct the terminal to send second service data to the at least one first measurement AP.

The receiving module 401 is further configured to: receive second measurement data fed back by the at least one first measurement AP, where the second measurement data includes second CSI, and the second CSI is obtained after the at least one first measurement AP performs channel estimation on the second service data; and send the second measurement data or a second processing result to the terminal, where the second processing result is obtained by using the second measurement data.

With reference to the foregoing embodiment, the sending module 403 is further configured to send a second CSI measurement request to the terminal. The second CSI measurement request includes an address of the at least one first measurement AP, so that the terminal determines a second measurement AP according to the address of the at least one first measurement AP.

The processing module 402 is further configured to: determine the coverage corresponding to the address of the first AP; and determine, according to the address of the first AP and an address of the first storage AP, the at least one first measurement AP within coverage corresponding to a MAC address of the first AP.

In one embodiment, the processing module is further configured to: determine, according to the coverage and the address of the first storage AP, the at least one first to-be-determined AP located within the coverage; and determine the at least one first measurement AP in the at least one first to-be-determined AP according to at least one of a frequency band used by the at least one first to-be-determined AP, a channel of the at least one first to-be-determined AP, bandwidth of the at least one first to-be-determined AP, network transmission traffic, or network service performance.

In this embodiment, after the receiving module 401 receives the CSI obtaining request sent by the terminal, the processing module 402 determines the at least one first measurement AP, and the sending module 403 sends the first CSI measurement request to the at least one first measurement AP. After the at least one first measurement AP obtains the first CSI, the receiving module 401 receives the first CSI fed back by the at least one first measurement AP. Therefore, CSI information on an uplink in a communication process is provided, thereby improving service precision.

Figure 5:
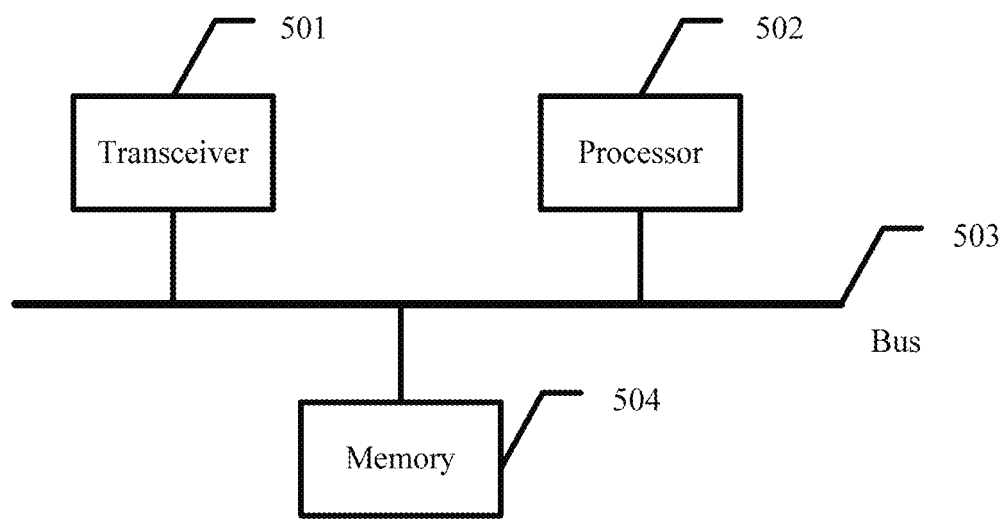
FIG. 5 is a schematic diagram of another embodiment of a server according to an embodiment of this application.

Referring to FIG. 5, another embodiment of a server according to an embodiment of this application includes a transceiver 501 and a processor 502. The transceiver 501 and the processor 502 are connected to each other by using a bus 503.

The transceiver 501 has the following function: receiving a CSI obtaining request sent by a terminal, where the CSI obtaining request includes an address of a first access point AP communicatively connected to the terminal and an address of the terminal.

The processor 502 has the following function: determining at least one first measurement AP in first storage APs according to the address of the first AP, where the first storage AP is an AP that can perform channel estimation on service data to obtain CSI. The transceiver 501 has the following functions: sending a first CSI measurement request to the at least one first measurement AP, where the first CSI measurement request includes the address of the terminal, so that the at least one first measurement AP listens to, according to the address of the terminal, first service data sent by the terminal; receiving first measurement data, where the first measurement data includes first CSI, the first CSI is obtained after a target measurement AP performs channel estimation on the first service data, and the target measurement AP is an AP that receives the first service data in the at least one first measurement AP; and sending the first measurement data or a first processing result to the terminal, where the first processing result is obtained by using the first measurement data.

The bus 503 may be a peripheral component interconnect (peripheral component interconnect, PCI for short) bus or an extended industry standard architecture (extended industry standard architecture, EISA for short) bus, or the like. The bus may be classified into an address bus, a data bus, a control bus, and the like. For ease of representation, only one bold line is used in FIG. 5 to represent the bus, but it does not indicate that there is only one bus or only one type of bus.

The processor 502 may be a central processing unit (central processing unit, CPU for short), a network processor (network processor, NP for short), or a combination of a CPU and an NP.

The processor 502 may further include a hardware chip. The hardware chip may be an application-specific integrated circuit (application-specific integrated circuit, ASIC for short), a programmable logic device (programmable logic device, PLD for short), or a combination thereof. The PLD may be a complex programmable logic device (complex programmable logic device, CPLD for short), a field-programmable gate array (field-programmable gate array, FPGA for short), generic array logic (generic array logic, GAL for short), or any combination thereof.

Referring to FIG. 5, the server may further include a memory 504. The memory 504 may include a volatile memory (volatile memory), such as a random access memory (random-access memory, RAM for short). The memory may also include a nonvolatile memory (nonvolatile memory), such as a flash memory (flash memory), a hard disk, or a solid-state drive (solid-state drive, SSD for short). The memory 504 may further include a combination of the foregoing types of memories.

In one embodiment, the memory 504 may be further configured to store a program instruction. The processor 502 invokes the program instruction stored in the memory 504, and may perform one or more operations or optional implementations in the embodiment shown in FIG. 2 or FIG. 3, to implement a function of a behavior of the server in the foregoing method.

With reference to the foregoing embodiment, the processor 502 has the following function: obtaining the first processing result and precision of the first processing result according to the first measurement data.

The transceiver 501 has the following functions: if the precision is less than or equal to a preset threshold, sending a multicast request to the terminal, where the multicast request includes an address of the at least one first measurement AP, and the multicast request is used to instruct the terminal to send second service data to the at least one first measurement AP; receiving second measurement data fed back by the at least one first measurement AP, where the second measurement data includes second CSI, and the second CSI is obtained after the at least one first measurement AP performs channel estimation on the second service data; and sending the second measurement data or a second processing result to the terminal, where the second processing result is obtained by using the second measurement data.

With reference to the foregoing embodiment, the transceiver 501 has the following function: sending a second CSI measurement request to the terminal, where the second CSI measurement request includes an address of the at least one first measurement AP, so that the terminal determines a second measurement AP according to the address of the at least one first measurement AP.

The processor 502 has the following functions: determining coverage corresponding to the address of the first AP; and determining, according to the address of the first AP and an address of the first storage AP, the at least one first measurement AP located within the coverage corresponding to the address of the first AP.

With reference to the foregoing embodiment, the processor 502 further has the following functions: determining, according to the coverage and the address of the first storage AP, the at least one first to-be-determined AP located within the coverage; and determining the at least one first measurement AP in the at least one first to-be-determined AP according to at least one of a frequency band used by the at least one first to-be-determined AP, a channel of the at least one first to-be-determined AP, bandwidth of the at least one first to-be-determined AP, network transmission traffic, or network service performance.

In this embodiment, after the transceiver 501 receives first CSI measurement request sent by the terminal, the processor 502 determines the at least one first measurement AP, and the transceiver 501 sends the CSI obtaining request to the at least one first measurement AP. After the at least one first measurement AP obtains the first CSI, the transceiver 501 receives the first CSI fed back by the at least one first measurement AP. Therefore, CSI information on an uplink in a communication process is provided, thereby leveraging CSI and improving service precision. In addition, CSI processing is performed on a server side, to reduce massive CSI information transmission and reduce network load.

Figure 6:
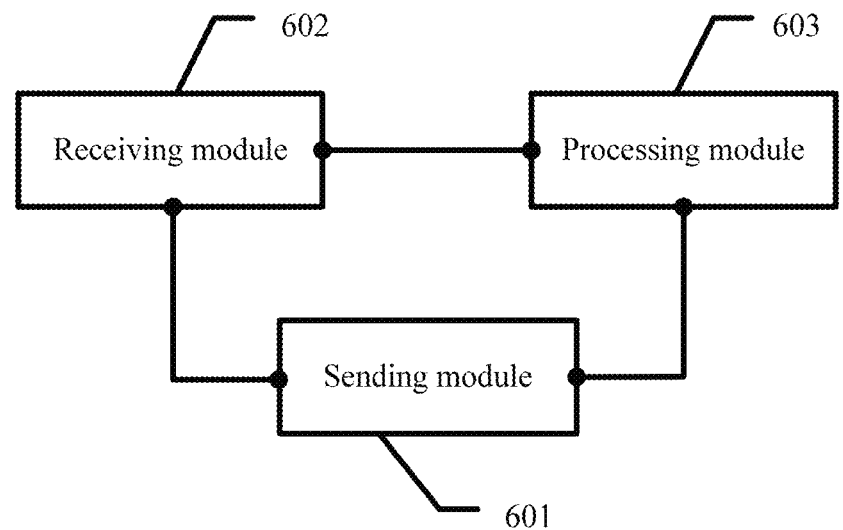
FIG. 6 is a schematic diagram of an embodiment of a terminal according to an embodiment of this application.

Referring to FIG. 6, an embodiment of a terminal according to an embodiment of this application includes:

a sending module 601, configured to send a CSI obtaining request to a server, where the CSI obtaining request includes an address of a first AP communicatively connected to the terminal and an address of the terminal; and a receiving module 602, configured to receive first measurement data or a first processing result sent by the server, where the first processing result is obtained by using the first measurement data, and the first measurement data includes first CSI.

With reference to the foregoing embodiment, the receiving module 602 is configured to receive an address of at least one first measurement AP and precision of the first processing result that are sent by the server.

The sending module 601 is further configured to: if the precision is less than or equal to a preset threshold, send second service data to the at least one first measurement AP, so that the at least one first measurement AP performs channel estimation on the second service data to obtain second CSI.

The receiving module 602 is further configured to receive second measurement data or a second processing result sent by the server. The second measurement data includes the second CSI, and the second processing result is obtained by using the second measurement data.

With reference to the foregoing embodiment, the terminal includes a processing module 603, configured to:

obtain a union set of an address of the second storage AP and an address of the at least one first measurement AP to obtain an address of a second measurement AP, where the second storage AP is an AP stored by the terminal, and the address of the at least one first measurement AP is from the server; listen to, according to the address of the second measurement AP, third service data sent by an AP in the second measurement AP; and when the third service data is received, perform channel estimation on the third service data to obtain third CSI.

With reference to the foregoing embodiment, the processing module 603 is further configured to obtain at least one of a service precision requirement or a service algorithm complexity requirement.

The sending module 601 is further configured to send the CSI obtaining request to the server only when the service precision requirement is greater than a first preset value and/or when the service algorithm complexity requirement is greater than a second preset value.

With reference to the foregoing embodiment, the sending module 601 is further configured to send the CSI obtaining request to the server in a form of a packet data unit.

In practical application, the processing module 603 of the terminal is further configured to: listen to, according to an address of a second storage AP, fourth service data sent by the second storage AP, where the second storage AP is an AP stored by the terminal; and perform channel estimation on the fourth service data to obtain fourth CSI.

In addition, the receiving module 601 of the terminal is further configured to receive third measurement data sent by the first AP, where the third measurement data includes fifth CSI, the fifth CSI is obtained after the first AP performs channel estimation on fifth service data sent by the terminal, and the first AP is an AP communicatively connected to the terminal.

In this case, the processing module 603 of the terminal is further configured to obtain at least one of a service precision requirement or a service algorithm complexity requirement.

The sending module 602 of the terminal is further configured to listen to, according to the address of the second storage AP only when the service precision requirement is less than or equal to a first preset value and/or when the service algorithm complexity requirement is less than or equal to a second preset value, the fourth service data sent by the second storage AP.

In this embodiment, the server sends information about the at least one first measurement AP to the receiving module 602. After the processing module 603 determines the second measurement AP according to the information about the at least one first measurement AP and information about a second AP that is provided by a local application layer of the terminal, the receiving module 602 receives the second CSI fed back by the second measurement AP. Therefore, CSI information on a downlink is provided, thereby improving service precision. In addition, in a case without participation of the server, the processing module 603 may also directly obtain CSI by measuring service data delivered by the second storage AP to the terminal.

Figure 7:
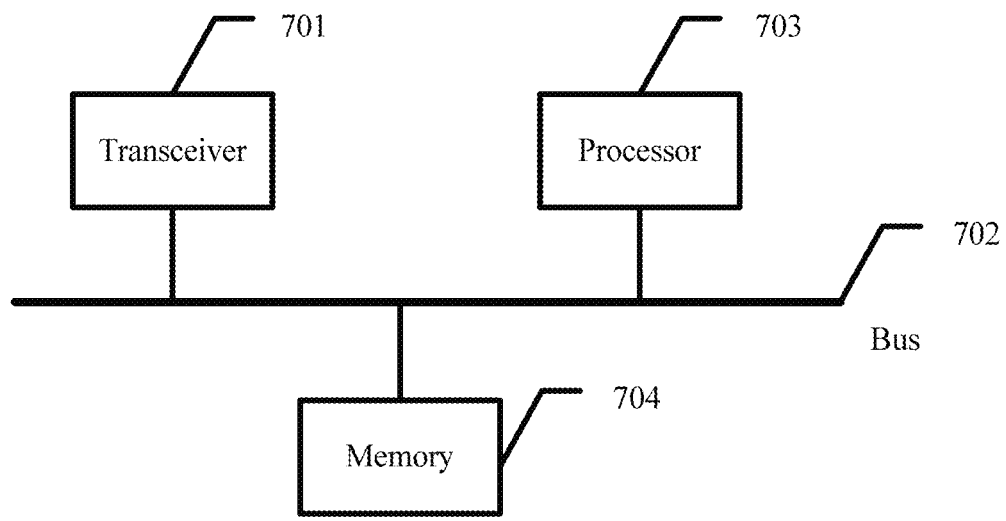
FIG. 7 is a schematic diagram of another embodiment of a terminal according to an embodiment of this application.

Referring to FIG. 7, another embodiment of a terminal according to an embodiment of this application includes:

a transceiver 701, where the transceiver 701 and a bus 702 are connected to each other.

The transceiver 701 has the following functions: sending a CSI obtaining request to a server, where the CSI obtaining request includes an address of a first AP communicatively connected to the terminal and an address of the terminal; and receiving first measurement data or a first processing result sent by the server, where the first processing result is obtained by using the first measurement data, and the first measurement data includes first CSI.

With reference to the foregoing embodiment, the transceiver 701 has the following functions: receiving an address of at least one first measurement AP and precision of the first processing result that are sent by the server; and if the precision is less than or equal to a preset threshold, sending second service data to the at least one first measurement AP, so that the at least one first measurement AP performs channel estimation on the second service data to obtain second CSI; and receiving second measurement data or a second processing result sent by the server, where the second measurement data includes the second CSI, and the second processing result is obtained by using the second measurement data.

With reference to the foregoing embodiment, the processor 703 has the following functions: obtaining a union set of an address of the second storage AP and an address of the at least one first measurement AP to obtain an address of a second measurement AP, where the second storage AP is an AP stored by the terminal, and the address of the at least one first measurement AP is from the server; listening to, according to the address of the second measurement AP, third service data sent by an AP in the second measurement AP; and when the third service data is received, performing channel estimation on the third service data to obtain third CSI.

With reference to the foregoing embodiment, the transceiver 701 has the following function: sending the CSI obtaining request to the server when a service precision requirement is less than a first preset value or when a service algorithm complexity requirement is less than a second preset value.

With reference to the foregoing embodiment, the transceiver 701 has the following function: sending the CSI obtaining request to the server in a form of a packet data unit.

In practical application, the processor 703 of the terminal has the following functions: listening to, according to an address of a second storage AP, fourth service data sent by the second storage AP, where the second storage AP is an AP stored by the terminal; and performing channel estimation on the fourth service data to obtain fourth CSI.

In addition, the transceiver 701 of the terminal has the following function: receiving third measurement data sent by the first AP, where the third measurement data includes fifth CSI, the fifth CSI is obtained after the first AP performs channel estimation on fifth service data sent by the terminal, and the first AP is an AP communicatively connected to the terminal.

In this case, the processor 703 of the terminal is further configured to obtain at least one of a service precision requirement or a service algorithm complexity requirement.

The transceiver 701 of the terminal has the following function: listening to, according to the address of the second storage AP only when the service precision requirement is less than or equal to a first preset value and/or when the service algorithm complexity requirement is less than or equal to a second preset value, the fourth service data sent by the second storage AP.

The bus 702 may be a PCI bus, an EISA bus, or the like. The bus may be classified into an address bus, a data bus, a control bus, and the like. For ease of representation, only one bold line is used in FIG. 7 to represent the bus, but it does not indicate that there is only one bus or only one type of bus.

The processor 703 may be a CPU, an NP, or a combination of a CPU and an NP.

The processor 703 may further include a hardware chip. The hardware chip may be an ASIC, a PLD, or a combination thereof. The PLD may be a CPLD, an FPGA, a GAL, or any combination thereof.

Referring to FIG. 7, the terminal may further include a memory 704. The memory 704 may include a volatile memory (volatile memory), such as a RAM. The memory may also include a nonvolatile memory (non-volatile memory), such as a flash memory (flash memory), a hard disk (hard disk drive, HDD for short), or a solid-state drive (solid-state drive, SSD for short). The memory 704 may further include a combination of the foregoing types of memories.

In one embodiment, the memory 704 may be further configured to store a program instruction. The processor 703 invokes the program instruction stored in the memory 704, and may perform one or more operations or optional implementations in the embodiment shown in FIG. 2 or FIG. 3 to implement a function of a behavior of the terminal in the foregoing method.

In this embodiment, the server sends information about the at least one first measurement AP to the transceiver 701. After the processor 703 determines the second measurement AP according to the information about the at least one first measurement AP and information about a second AP that is provided by a local application layer of the terminal, the transceiver 701 receives the second CSI fed back by the second measurement AP. Therefore, CSI information on a downlink is provided, thereby improving service precision. In addition, in a case without participation of the server, the processor 703 may also directly obtain CSI by measuring service data delivered by the second storage AP to the terminal.

Figure 8:
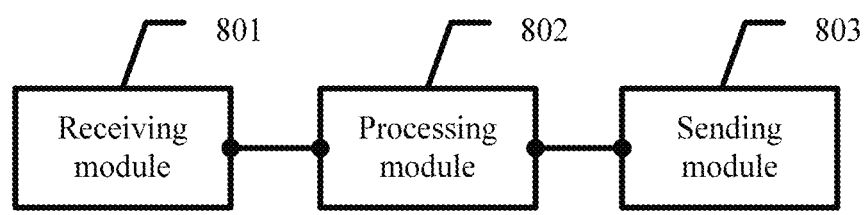
FIG. 8 is a schematic diagram of an embodiment of an AP according to an embodiment of this application.

Referring to FIG. 8, an embodiment of an AP according to an embodiment of this application includes: a receiving module 801, a processing module 802, and a sending module 803.

The receiving module 801 is configured to receive a first CSI measurement request sent by a server. The first CSI measurement request includes an address of a terminal.

The processing module 802 is configured to: listen to, according to the address of the terminal received by the receiving module 801, first service data sent by the terminal; and when the first service data is received, perform channel estimation on the first service data sent by the terminal, to obtain first CSI.

The sending module 803 is configured to send the first measurement data to the server. The first measurement data includes the first CSI.

With reference to the foregoing embodiment, the sending module 803 is further configured to send the first measurement data to the server in a form of a packet data unit.

In this embodiment, after the receiving module 801 receives a CSI obtaining request sent by the server, the terminal sends the CSI obtaining request to the server. The processing module 802 monitors service data of the terminal to obtain the first CSI, and the sending module 803 sends the first CSI to the server. Therefore, CSI information on an uplink in a communication process is provided, thereby improving service precision.

Figure 9:
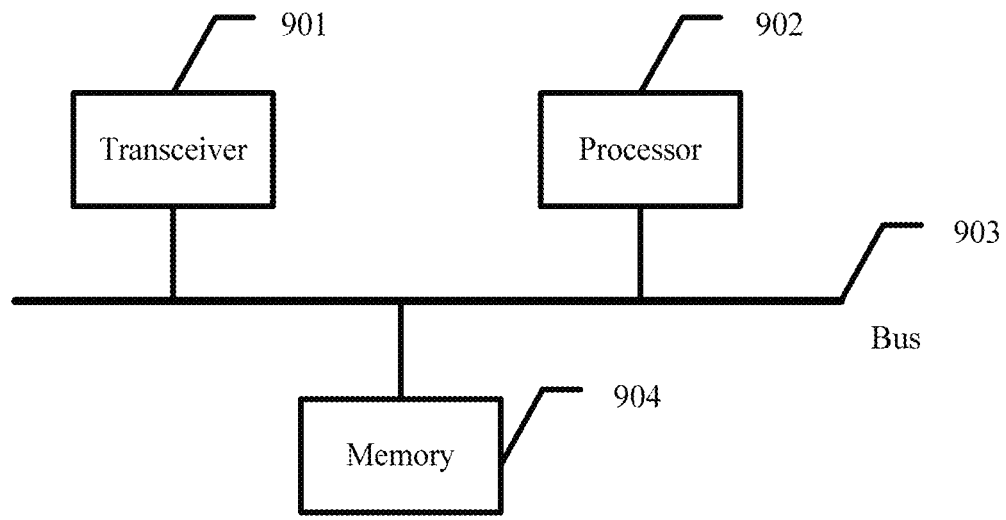
FIG. 9 is a schematic diagram of another embodiment of an AP according to an embodiment of this application.

Referring to FIG. 9, another embodiment of an AP according to an embodiment of this application includes:

a transceiver 901, a processor 902, and a bus 903.

The transceiver 901 is connected to the processor 902 by using the bus 903.

The transceiver 901 performs the following operation:

receiving a first CSI measurement request sent by a server, where the first CSI measurement request includes an address of a terminal.

The processor 902 performs the following operations:

listening to, according to the address of the terminal, first service data sent by the terminal; and when the first service data is received, performing channel estimation on the first service data sent by the terminal, to obtain first CSI.

The transceiver 901 further performs the following operation:

sending the first measurement data to the server, where the first measurement data includes the first CSI.

The bus 903 may be a PCI bus, an EISA bus, or the like. The bus may be classified into an address bus, a data bus, a control bus, and the like. For ease of representation, only one bold line is used in FIG. 9 to represent the bus, but it does not indicate that there is only one bus or only one type of bus.

The processor 902 may be a CPU, an NP, or a combination of a CPU and an NP.

The processor 902 may further include a hardware chip. The hardware chip may be an ASIC, a PLD, or a combination thereof. The PLD may be a CPLD, an FPGA, a GAL, or any combination thereof.

Referring to FIG. 9, the AP may further include a memory 904. The memory 904 may include a volatile memory (volatile memory), such as a RAM. The memory may also include a nonvolatile memory (non-volatile memory), such as a flash memory (flash memory), an HDD, or an SSD. The memory 904 may further include a combination of the foregoing types of memories.

In one embodiment, the memory 904 may be further configured to store a program instruction. The processor 902 invokes the program instruction stored in the memory 904, and may perform one or more operations or optional implementations in the embodiment shown in FIG. 2 or FIG. 3 to implement a function of a behavior of the AP in the foregoing method.

With reference to the foregoing embodiment, the transceiver 901 further performs the following operation: sending the first measurement data to the server in a form of a packet data unit.

In this embodiment, after the transceiver 901 receives a CSI obtaining request sent by the server, the terminal sends the CSI obtaining request to the server. The processor 902 monitors service data of the terminal to obtain the first CSI. The transceiver 901 sends the first CSI to the server. Therefore, CSI information on an uplink in a communication process is provided, thereby leveraging CSI and improving service precision.

It may be clearly understood by persons skilled in the art that, for the purpose of convenient and brief description, for a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the operations of the methods described in the embodiments of the present disclosure. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method of obtaining channel state information by a server, the method comprising:

receiving a channel state information (CSI) obtaining request sent by a terminal, wherein the CSI obtaining request comprises an address of a first access point (AP) communicatively connected to the terminal and an address of the terminal;

determining at least one first measurement AP in first storage APs according to the address of the first AP, wherein the first storage APs are APs that are stored by the server and that perform channel estimation on service data to obtain CSI, and the at least one first measurement AP is an AP within coverage corresponding to the address of the first AP;

sending a first CSI measurement request to the at least one first measurement AP, wherein the first CSI measurement request comprises the address of the terminal, so that the at least one first measurement AP listens to, according to the address of the terminal, first service data sent by the terminal;

receiving first measurement data, wherein the first measurement data comprises first CSI, the first CSI is obtained after a target measurement AP performs channel estimation on the first service data obtained by means of listening, and the target measurement AP is an AP that obtains the first service data by means of listening in the at least one first measurement AP; and sending, by the server, the first measurement data or a first processing result to the terminal, wherein the first processing result is obtained by using the first measurement data.

2. The method according to claim 1, further comprising:
obtaining precision of the first processing result according to the first measurement data;

if the precision is less than or equal to a preset threshold, sending a multicast request to the terminal, wherein the multicast request comprises an address of the at least one first measurement AP, and the multicast request is used to instruct the terminal to send second service data to the at least one first measurement AP; and receiving second measurement data fed back by the at least one first measurement AP, wherein the second measurement data comprises second CSI, and the second CSI is obtained after the at least one first measurement AP performs channel estimation on the second service data; and sending the second measurement data or a second processing result to the terminal, wherein the second processing result is obtained by using the second measurement data.

3. The method according to claim 1, wherein after the determining at least one first measurement AP according to the address of the first AP, the method further comprising:
sending a second CSI measurement request to the terminal, wherein the second CSI measurement request comprises an address of the at least one first measurement AP, so that the terminal determines a second measurement AP according to the address of the at least one first measurement AP.

4. The method according to claim 1, wherein the first measurement data further comprises identification information of the first CSI, and the identification information of the first CSI comprises at least one of an antenna configuration of the at least one first measurement AP, a frequency band of the at least one first measurement AP, a channel of the at least one first measurement AP, a Media Access Control (MAC) address of the terminal, or a MAC address of the at least one first measurement AP.

5. The method according to claim 1, wherein the determining at least one first measurement AP in first storage APs according to the address of the first AP comprises:
determining, according to the address of the first AP, the coverage corresponding to the address of the first AP; and determining, according to the coverage and an address of the first storage AP, the at least one first measurement AP that is located within the coverage and that is in the first storage AP.

6. The method according to claim 5, wherein the determining, according to the coverage and an address of the first storage AP, the at least one first measurement AP located within the coverage comprises:

determining, according to the coverage and the address of the first storage AP, the at least one first to-be-determined AP located within the coverage; and determining the at least one first measurement AP in the at least one first to-be-determined AP according to at least one of a frequency band used by the at least one first to-be-determined AP, a channel of the at least one first to-be-determined AP, bandwidth of the at least one first to-be-determined AP, network transmission traffic, or network service performance.

7. A method of obtaining channel state information by a terminal, the method comprising:
sending a channel state information (CSI) obtaining request to a server, wherein the CSI obtaining request comprises an address of a first AP communicatively connected to the terminal and an address of the terminal; and receiving first measurement data or a first processing result sent by the server, wherein the first processing result is obtained by using the first measurement data, and the first measurement data comprises first CSI.

8. The method according to claim 7, further comprising:
receiving an address of at least one first measurement AP and precision of the first processing result that are sent by the server;

if the precision is less than or equal to a preset threshold, sending second service data to the at least one first measurement AP, so that the at least one first measurement AP performs channel estimation on the second service data to obtain second CSI; and receiving second measurement data or a second processing result sent by the server, wherein the second measurement data comprises the second CSI, and the second processing result is obtained by using the second measurement data.

9. The method according to claim 7, wherein after sending a CSI obtaining request to a server, the method further comprising:
obtaining a union set of an address of a second storage AP and an address of the at least one first measurement AP to obtain an address of a second measurement AP, wherein the second storage AP is an AP that is stored by the terminal and that can be is communicatively connected to the terminal, and the address of the at least one first measurement AP is from the server;

listening to, according to the address of the second measurement AP, third service data sent by an AP in the second measurement AP; and when the third service data is received, performing channel estimation on the third service data to obtain third CSI.

10. The method according to claim 7, further comprising:
obtaining at least one of a service precision requirement or a service algorithm complexity requirement; and sending the CSI obtaining request to the server only when the service precision requirement is greater than a first preset value and/or or when the service algorithm complexity requirement is greater than a second preset value.

11. A server, comprising:
a receiving module configured to receive a channel state information (CSI) obtaining request sent by a terminal, wherein the CSI obtaining request comprises an address of a first access point AP communicatively connected to the terminal and an address of the terminal;

a processing module configured to determine at least one first measurement AP in first storage APs according to the address of the first AP, wherein the first storage APs are APs that are stored by the server and that perform channel estimation on service data to obtain CSI, and the at least one first measurement AP is an AP within coverage corresponding to the address of the first AP; and a sending module configured to send a first CSI measurement request to the at least one first measurement AP determined by the processing module, wherein the first CSI measurement request comprises the address of the terminal, so that the at least one first measurement AP listens to, according to the address of the terminal, first service data sent by the terminal, wherein the receiving module is further configured to receive first measurement data, wherein the first measurement data comprises first CSI, the first CSI is obtained after a target measurement AP performs channel estimation on the first service data obtained by means of listening, and the target measurement AP is an AP that obtains the first service data by means of listening in the at least one first measurement AP; and the sending module is further configured to send the first measurement data or a first processing result by the server to the terminal, wherein the first processing result is obtained by using the first measurement data.

12. The server according to claim 11, wherein the processing module is further configured to obtain precision of the first processing result according to the first measurement data;

the sending module is further configured to: if the precision is less than or equal to a preset threshold, send a multicast request to the terminal, wherein the multicast request comprises an address of the at least one first measurement AP, and the multicast request is used to instruct the terminal to send second service data to the at least one first measurement AP; and the receiving module is further configured to: receive second measurement data fed back by the at least one first measurement AP, wherein the second measurement data comprises second CSI, and the second CSI is obtained after the at least one first measurement AP performs channel estimation on the second service data; and the sending module is further configured to send the second measurement data or a second processing result to the terminal, wherein the second processing result is obtained by using the second measurement data.

13. The server according to claim 11, wherein the sending module is further configured to send a second CSI measurement request to the terminal, wherein the second CSI measurement request comprises an address of the at least one first measurement AP, so that the terminal determines a second measurement AP according to the address of the at least one first measurement AP.

14. The server according to claim 11, wherein the first measurement data further comprises identification information of the first CSI, and the identification information of the first CSI comprises at least one of an antenna configuration of the at least one first measurement AP, a frequency band of the at least one first measurement AP, a channel of the at least one first measurement AP, a MAC address of the terminal, or a MAC address of the at least one first measurement AP.

15. The server according to claim 11, wherein the processing module is further configured to:
determine, according to the address of the first AP, the coverage corresponding to the address of the first AP; and
determine, according to the coverage and an address of the first storage AP, the at least one first measurement AP that is located within the coverage and that is in the first storage AP.

16. The server according to claim 15, wherein the processing module is further configured to:
determine, according to the coverage and the address of the first storage AP, the at least one first to-be-determined AP located within the coverage; and
determine the at least one first measurement AP in the at least one first to-be-determined AP according to at least one of a frequency band used by the at least one first to-be-determined AP, a channel of the at least one first to-be-determined AP, bandwidth of the at least one first to-be-determined AP, network transmission traffic, or network service performance.

17. A terminal, comprising:
a sending module configured to send a channel state information (CSI) obtaining request to a server, wherein the CSI obtaining request comprises an address of a first AP communicatively connected to the terminal and an address of the terminal;
a receiving module configured to receive first measurement data or a first processing result sent by the server, wherein the first processing result is obtained by using the first measurement data, and the first measurement data comprises first CSI; and
a processing module configured to:
obtain a union set of an address of the second storage AP and an address of the at least one first measurement AP to obtain an address of a second measurement AP, wherein the second storage AP is an AP that is stored by the terminal and that is communicatively connected to the terminal, and the address of the at least one first measurement AP is from the server;
listen to, according to the address of the second measurement AP, third service data sent by an AP in the second measurement AP; and
when the third service data is received, perform channel estimation on the third service data to obtain third CSI.

18. The terminal according to claim 17, wherein the receiving module is further configured to receive an address of at least one first measurement AP and precision of the first processing result that are sent by the server;
the sending module is further configured to: if the precision is less than or equal to a first preset threshold, send second service data to the at least one first measurement AP, so that the at least one first measurement AP performs channel estimation on the second service data to obtain second CSI; and
the receiving module is further configured to receive second measurement data or a second processing result sent by the server, wherein the second measurement data comprises the second CSI, and the second processing result is obtained by using the second measurement data.

19. The terminal according to claim 17, wherein the processing module is further configured to obtain at least one of a service precision requirement or a service algorithm complexity requirement; and
the sending module is further configured to send the CSI obtaining request to the server only when the service precision requirement is greater than a second preset threshold or when the service algorithm complexity requirement is greater than a third preset threshold.

\* \* \* \* \*